US007651103B1

(12) United States Patent
Peridon

(10) Patent No.: US 7,651,103 B1
(45) Date of Patent: Jan. 26, 2010

(54) WHEELCHAIR

(76) Inventor: Marlyn Peridon, 2407 Melrose Ave., Bossier City, LA (US) 71111

( * ) Notice: Subject to any disclaimer, the term of this patent is extended or adjusted under 35 U.S.C. 154(b) by 265 days.

(21) Appl. No.: 11/704,617

(22) Filed: Feb. 9, 2007

(51) Int. Cl.
*B60K 1/00* (2006.01)

(52) U.S. Cl. .................. 280/5.22; 280/647; 280/304.1; 180/65.1

(58) Field of Classification Search .................. 280/5.2, 280/5.22, 304.1, 642, 647, 250.1; 180/65.1; 14/71.1, 69.5; 182/48
See application file for complete search history.

(56) References Cited

U.S. PATENT DOCUMENTS 4,326,732 A * 4/1982 Gall et al. .................. 280/642
4,432,426 A * 2/1984 Misawa ...................... 180/8.2
4,528,711 A * 7/1985 Packer ........................ 14/69.5
4,989,890 A * 2/1991 Lockard et al. ............... 280/42
5,277,436 A * 1/1994 Frank et al. .................. 280/5.2
5,335,741 A * 8/1994 Rabinovitz et al. ........... 180/8.2
5,457,837 A * 10/1995 Zuckerbrod ................. 14/69.5
5,517,708 A * 5/1996 Baranowski ................ 14/69.5
6,345,950 B1 * 2/2002 Gerwitz ...................... 414/537
6,643,878 B2 * 11/2003 Schmaltz et al. ............. 14/69.5
7,311,160 B2 * 12/2007 Lim .......................... 180/9.26
7,374,195 B1 * 5/2008 Varner et al. ................ 280/642
2008/0067762 A1 * 3/2008 Rembos et al. ............ 280/5.22

* cited by examiner

*Primary Examiner*—Tony H. Winner
(74) *Attorney, Agent, or Firm*—R. Keith Harrison

(57) ABSTRACT

A wheelchair is disclosed. An illustrative embodiment of the wheelchair includes a wheelchair frame, a pair of rear wheels and a pair of front wheels carried by the wheelchair frame, a drive motor drivingly engaging at least one of the pair of rear wheels and the pair of front wheels and a pair of wheelchair tracks detachably carried by the wheelchair frame.

7 Claims, 5 Drawing Sheets

WHEELCHAIR

FIELD

The present invention relates to wheelchairs. More particularly, the present invention relates to a wheelchair which is capable of traversing steps.

BACKGROUND

In recent years, public buildings have become fitted with wheelchair ramps in an effort to render such buildings more accessible to physically-challenged persons. However, some public and private buildings remain inaccessible by wheelchair-bound persons. Therefore, a wheelchair is needed which is capable of traversing steps.

SUMMARY

The present invention is generally directed to a wheelchair. An illustrative embodiment of the wheelchair includes a wheelchair frame, a pair of rear wheels and a pair of front wheels carried by the wheelchair frame, a drive motor drivingly engaging at least one of the pair of rear wheels and the pair of front wheels and a pair of wheelchair tracks detachably carried by the wheelchair frame.

BRIEF DESCRIPTION OF THE DRAWINGS

The invention will now be described, by way of example, with reference to the accompanying drawings, in which.

DETAILED DESCRIPTION

Figure 3:
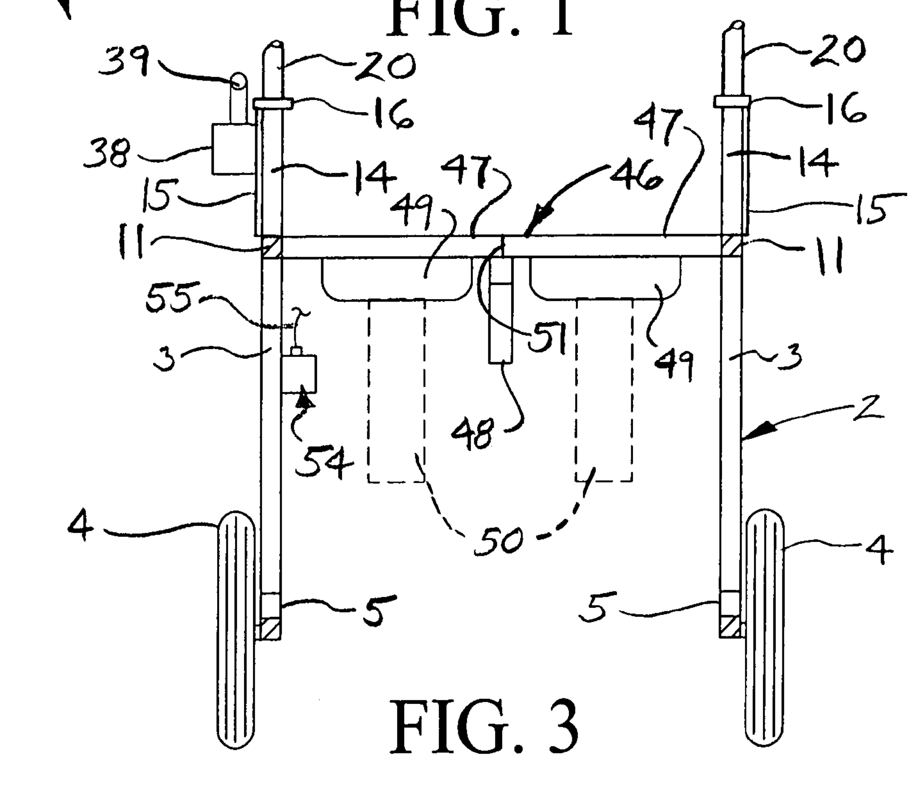
FIG. 3 is a front view, partially in section, of an illustrative embodiment of the wheelchair, more particularly illustrating a pair of pockets provided on the undersides of a seat of the wheelchair.

Referring to the drawings, an illustrative embodiment of the wheelchair is generally indicated by reference numeral 1. The wheelchair 1 includes a wheelchair frame 2 having a pair of generally elongated, parallel, spaced-apart front frame members 3, as illustrated in FIG. 3. A pair of front wheels 4 is provided on the respective front frame members 3. In some embodiments of the wheelchair 1, a lockable hinge 5 connects each front wheel 4 to the corresponding front frame member 3.

Figure 1:
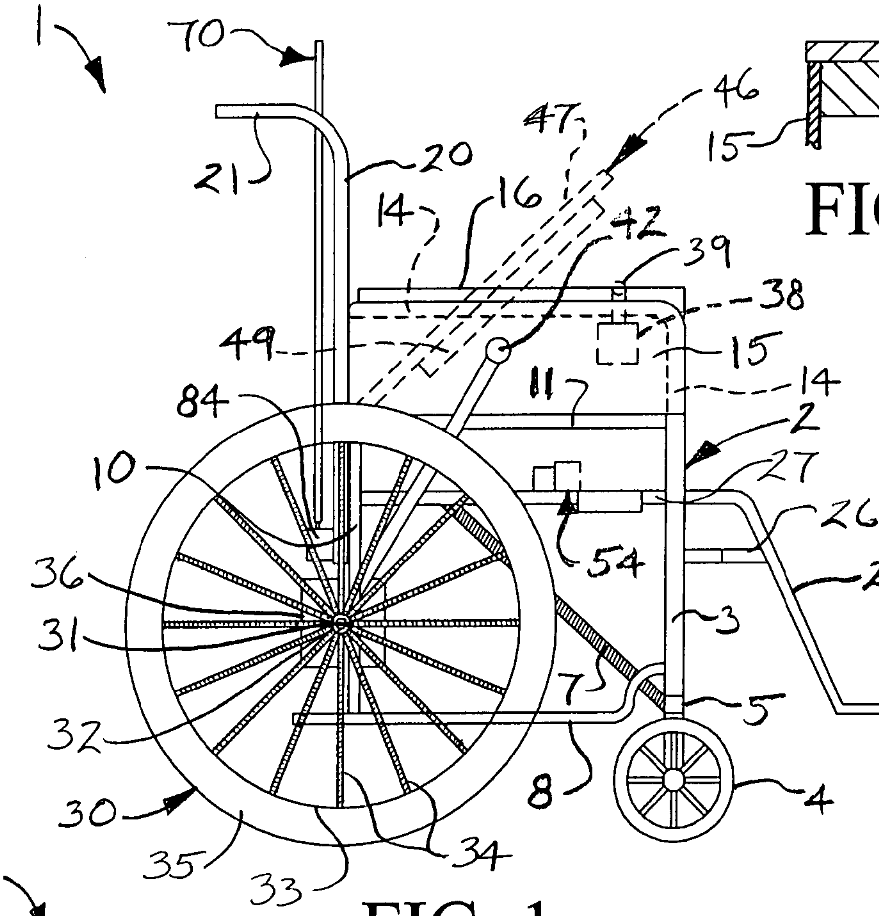
FIG. 1 is a side view of an illustrative embodiment of the wheelchair, with a seat element (in phantom) of the wheelchair shown in a raised position.
Figure 7:
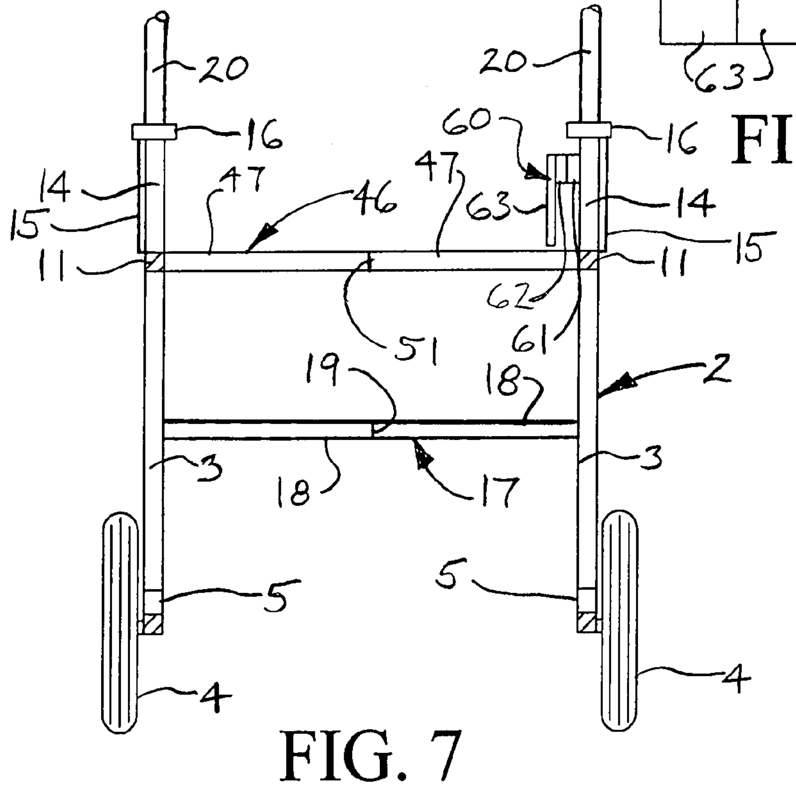
FIG. 7 is a front view, partially in section, of an illustrative embodiment of the wheelchair, more particularly illustrating a pocket provided on an armrest frame element of the wheelchair.

A pair of generally elongated, parallel, spaced-apart rear frame members 10 (one of which is shown in FIG. 1) extends in spaced-apart relationship with respect to the respective front frame members 3. A bottom frame member 8 connects each front frame member 3 to the corresponding rear frame member 10. A seat support frame member 11 extends between each front frame member 3 and the corresponding rear frame member 10 in generally parallel, spaced-apart relationship with respect to the bottom frame member 8. As illustrated in FIG. 7, in some embodiments of the wheelchair 1, at least one frame stabilizer 17 extends between the front frame members 3 and/or between the rear frame members 10. The frame stabilizer 17 typically includes a pair of stabilizer segments 18 which are pivotally attached to the respective front frame members 3 or rear frame members 10. The stabilizer segments 18 are pivotally attached to each other at a stabilizer hinge 19.

A pair of rear wheels 30 (one of which is illustrated in FIG. 1) is rotatably mounted on the wheelchair frame 2. Each rear wheel 30 typically includes a rear wheel axle 31 which is rotatably mounted on a corresponding rear frame member 10 of the wheelchair frame 2. A rear wheel hub 32 is provided on the rear wheel axle 31. A rear wheel rim 33, on which is mounted a tire 35, is generally concentric with the rear wheel hub 32. Multiple spokes 34 connect the rear wheel rim 33 to the rear wheel hub 32. In some embodiments, each of the spokes 34 is a spring. Accordingly, the spring spokes 34 provide-shock-absorbing capability between the rear wheel rim 33 and the rear wheel hub 32. An electric drive motor 36 is provided on the wheelchair frame 2 and drivingly engages the rear wheel axle 31.

Figure 4:
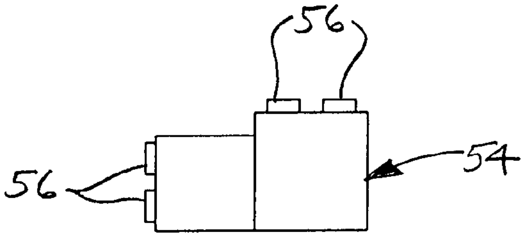
FIG. 4 is a side view of an exemplary battery element of an illustrative embodiment of the wheelchair.

As illustrated in phantom in FIG. 1, a control box 38, fitted with a control lever 39, is provided on the wheelchair frame 2 and connected to the drive motor 36 to facilitate directional control of the drive motor 36. The control lever 39 is positional between rearward, neutral and forward positions to facilitate rearward, neutral and forward driving positions of the wheelchair 1. The control box 38 may be provided in any position which is accessible to a person (not illustrated) sitting in the wheelchair 1, such as on the inside or outside surface of one of the armrest panels 15, for example. A battery 54 is provided on the wheelchair frame 2 and connected to the control box 38 through battery wiring 55, as illustrated in FIG. 3. As illustrated in FIG. 4, in some embodiments, the battery 54 includes multiple sets of positive and negative terminals 56. As illustrated in FIG. 1, in some embodiments of the wheelchair 1, a brake lever 42 engages the rear wheel axle 31 of at least one rear wheel 30 to facilitate manual braking of the rear wheel 30, according to the knowledge of those skilled in the art.

Figure 10:
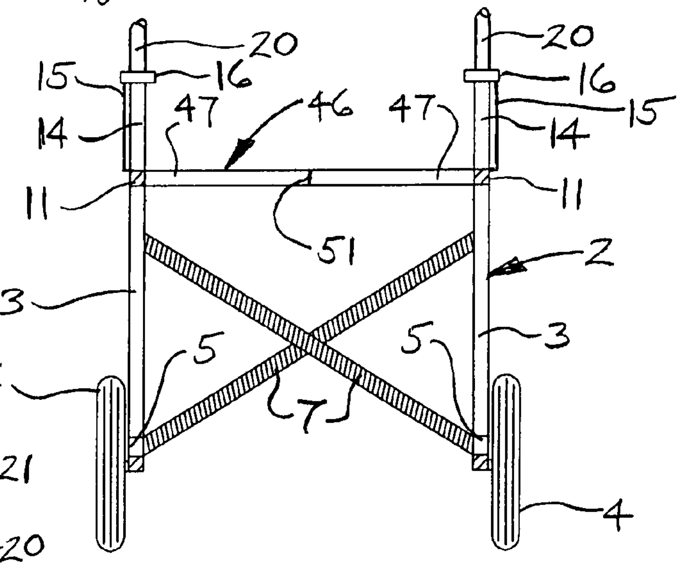
FIG. 10 is a front view, partially in section, of an illustrative embodiment of the wheelchair, more particularly illustrating a pair of frame springs provided on a wheelchair frame of the wheelchair.
Figure 14:
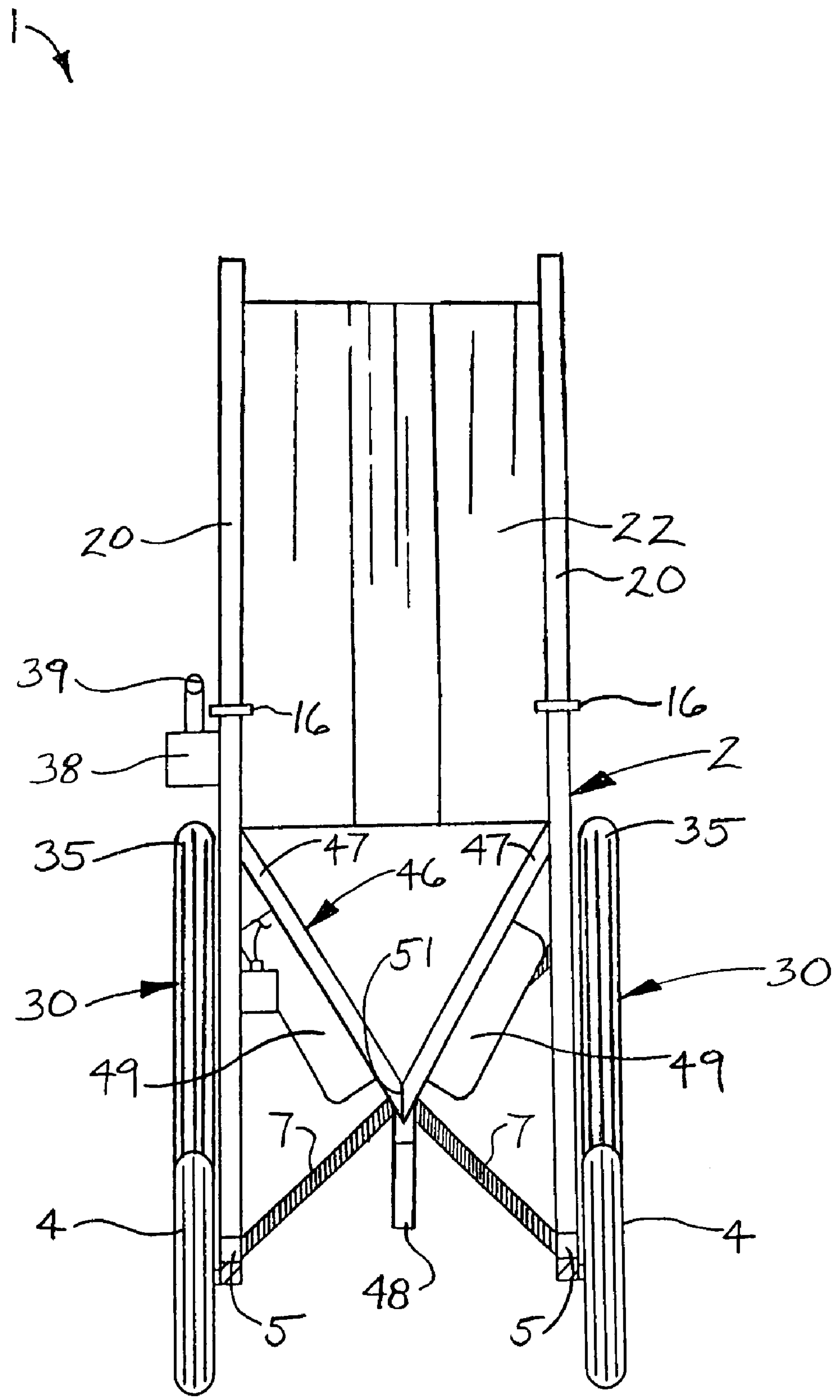
FIG. 14 is a front view of an illustrative embodiment of the wheelchair, shown in a partially folded or collapsed configuration.

A seat 46 is provided on the seat support frame members 11. As illustrated in FIG. 3, in some embodiments, the seat 46 includes a pair of seat panels 47 which extend from the respective seat support frame members 11. Each seat panel 47 is pivotally attached to the corresponding seat support frame member 11. A seat hinge 51 pivotally connects the seat panels 47 to each other. A seat strap 48 extends from the seat 46 and can be pulled downwardly to facilitate folding of the seat 46 as the seat panels 47 pivot with respect to the seat hinge 51, as illustrated in FIG. 14, for purposes of storing the wheelchair 1 when not in use. As illustrated in FIGS. 1, 10 and 14, in some embodiments of the wheelchair 1, a frame spring 7 extends between each footrest support frame member 27 and the opposite front frame member 3 of the wheelchair frame 2. At least one pocket 49 may be provided on a bottom surface of the seat 46. For example, at least one pocket 49 may be provided on each seat panel 47 of the seat 46. In some embodiments, a footrest strap 50 (shown in phantom in FIG. 3) extends from each pocket 49 for purposes which will be hereinafter described.

Figure 9:
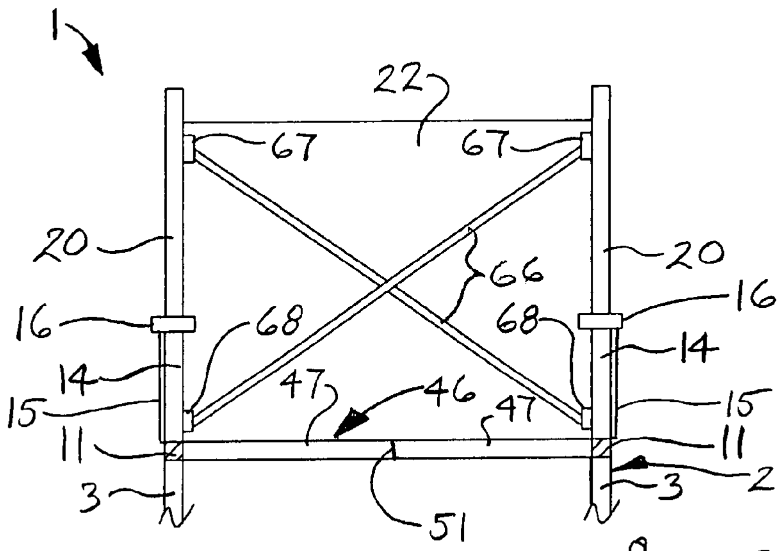
FIG. 9 is a front view, partially in section, of an illustrative embodiment of the wheelchair, more particularly illustrating a pair of cross straps provided on the wheelchair.

A pair of generally elongated handle frame members 20 extends from the respective rear frame members 10 of the wheelchair frame 2 in generally parallel, spaced-apart relationship with respect to each other. A handle 21 extends rearwardly from each handle frame member 20. As illustrated in FIG. 9, a flexible backrest panel 22 extends between the handle frame members 20. The backrest panel 22 may be any flexible material or fabric including leather or vinyl, in non-exclusive particular.

Figure 2:
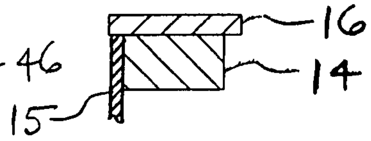
FIG. 2 is a cross-sectional view of an armrest element of an illustrative embodiment of the wheelchair.

As further illustrated in FIGS. 1 and 2, an armrest frame 14 extends from each front frame member 3 and is typically attached to the corresponding handle frame member 20. An armrest panel 15 may be provided on each armrest frame 14. As illustrated in FIG. 2, a generally elongated armrest 16, which may be padded, is provided on each armrest frame 14.

A generally elongated footrest support frame member 27 extends between each front frame member 3 and the corresponding rear frame member 10 of the wheelchair frame 2, typically between the bottom frame member 8 and the seat support frame 11 on each corresponding side of the wheelchair frame 2. An elongated footrest frame member 24 extends from each footrest support frame member 27. A footrest 25 extends from each footrest frame member 24. A folding footrest hinge 26 may connect each footrest frame member 24 to the corresponding front frame member 3 of the wheelchair frame 2. In some embodiments, each footrest frame member 24 is pivotally attached to the corresponding footrest support frame member 27 to facilitate selective folding of each footrest frame member 24 and footrest 25 beneath the seat 46.

Figure 8:
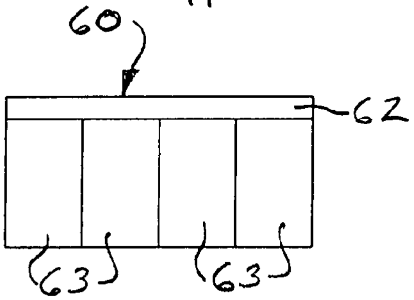
FIG. 8 is a front view of the pocket provided on an armrest frame element of the wheelchair as illustrated in FIG. 7.

As illustrated in FIGS. 7 and 8, in some embodiments of the wheelchair 1, a pocket assembly 60 is provided on the inner surface of one of the armrest panels 15. The pocket assembly 60 includes an elongated first pocket attachment strip 61 which is attached to the armrest panel 15 according to the knowledge of those skilled in the art, such as using an adhesive, for example. An elongated second pocket attachment strip 62 is attached to the first pocket attachment strip 61. In some embodiments, the second pocket attachment strip 62 is detachably attached to the first pocket attachment strip 61. At least one pocket 63 is provided on the second pocket attachment strip 62. In some embodiments, multiple pockets 63 are provided on the second pocket attachment strip 62 in adjacent relationship with respect to each other, as illustrated in FIG. 8. Accordingly, various items (not illustrated) can be placed in the pocket or pockets 63 when a user (not illustrated) is seated in the wheelchair 1.

As illustrated in FIG. 9, in some embodiments of the wheelchair 1, a pair of cross straps 66 is provided on the respective handle frame members 20 of the wheelchair frame 2. Each cross strap 66 is typically spring-loaded and selectively extendable from a strap receptacle 67 provided on each corresponding handle frame member 20. A buckle (not illustrated) terminates each cross strap 66 and can be releasably inserted in a corresponding buckle receptacle 68 which is provided on the opposite handle frame member 20. Therefore, the cross straps 66 can be extended from the respective strap receptacles 67, over a user (not illustrated) as the user sits on the seat 46 of the wheelchair 1 and the buckles (not illustrated) on the cross straps 66 releasably inserted in the respective buckle receptacles 68 to secure the user in the seat 46.

Figure 6:
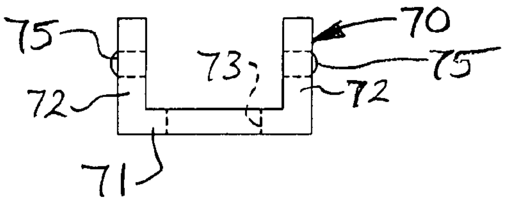
FIG. 6 is an end view, taken along view lines 6-6 in FIG. 5, of a track element of an illustrative embodiment of the wheelchair.
Figure 5:
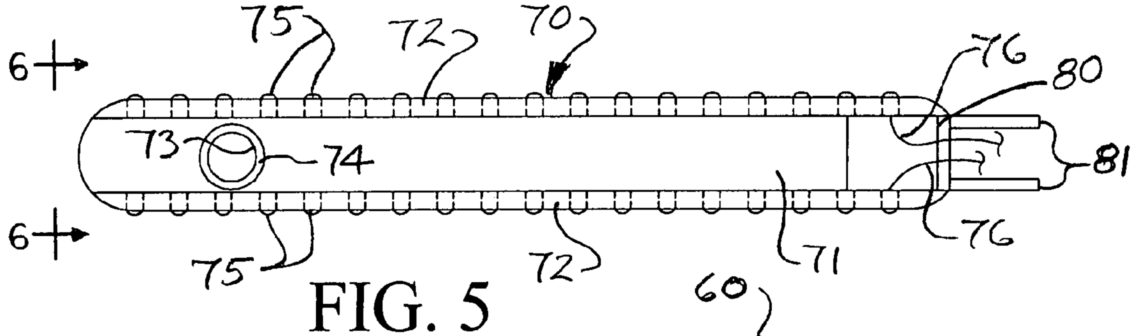
FIG. 5 is a top view of a wheelchair track element of an illustrative embodiment of the wheelchair.

As illustrated in FIG. 1, a pair of wheelchair tracks 70 (one of which is illustrated), the purpose of which will be hereinafter described, is removably attached to the respective handles 21 of the wheelchair frame 2. As illustrated in FIGS. 5 and 6, each wheelchair track 70 has a generally channel-shaped cross-section and includes an elongated track plate 71. A pair of generally elongated, parallel, spaced-apart track flanges 72 extends from opposite longitudinal edges of the track plate 71. A track opening 73 extends through the track plate 71 adjacent to a first end of the wheelchair track 70. A magnetic ring 74 typically encircles the track opening 73. Each wheelchair track 70 is secured to the corresponding handle 21 in a storage position by inserting the handle 21 through the track opening 73 such that the magnetic attachment ring 74 is magnetically attracted to the handle 21 and the wheelchair track 70 is suspended from the handle 21.

As further illustrated in FIG. 5, in some embodiments of the wheelchair 1, multiple track lights 75 are provided in each of the track flanges 72 in spaced-apart relationship with respect to each other. The track lights 75 are electrically connected to the control box 38 (FIG. 1) through light wiring 76. A track peg plate 80 may be provided on the track plate 71 adjacent to a second end of the wheelchair track 70. The light wiring 76 is secured to the track peg plate 80 using techniques which are known by those skilled in the art.

As further illustrated in FIG. 5, in some embodiments of the wheelchair 1, a pair of spaced-apart track pegs 81 extends from the track plate 71, at the second end of the wheelchair track 70. As illustrated in FIG. 1, a peg box 84 having a pair of peg openings (not illustrated) is provided on the wheelchair frame 2, beneath each handle 21. When each wheelchair track 70 is attached to the corresponding handle 21, the track pegs 81 are removably inserted in the respective peg openings in the peg box 84 to additionally support the wheelchair tracks 70 in the storage position on the wheelchair frame 2.

Figure 11:
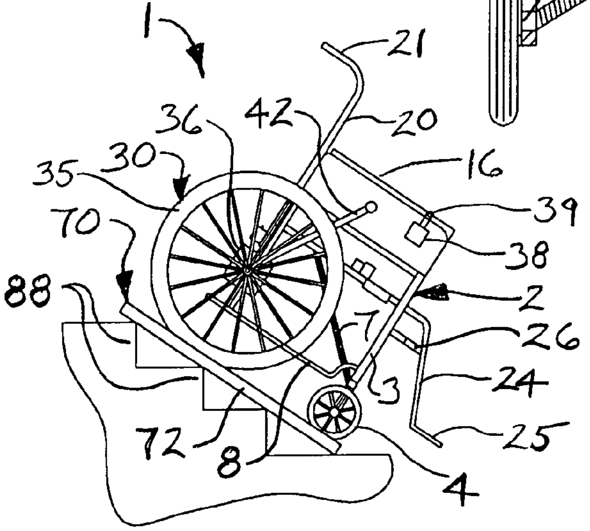
FIG. 11 is a side view of an illustrative embodiment of the wheelchair, with the tracks provided on a series of steps and more particularly illustrating the wheelchair traversing the steps on the tracks.
Figure 12:
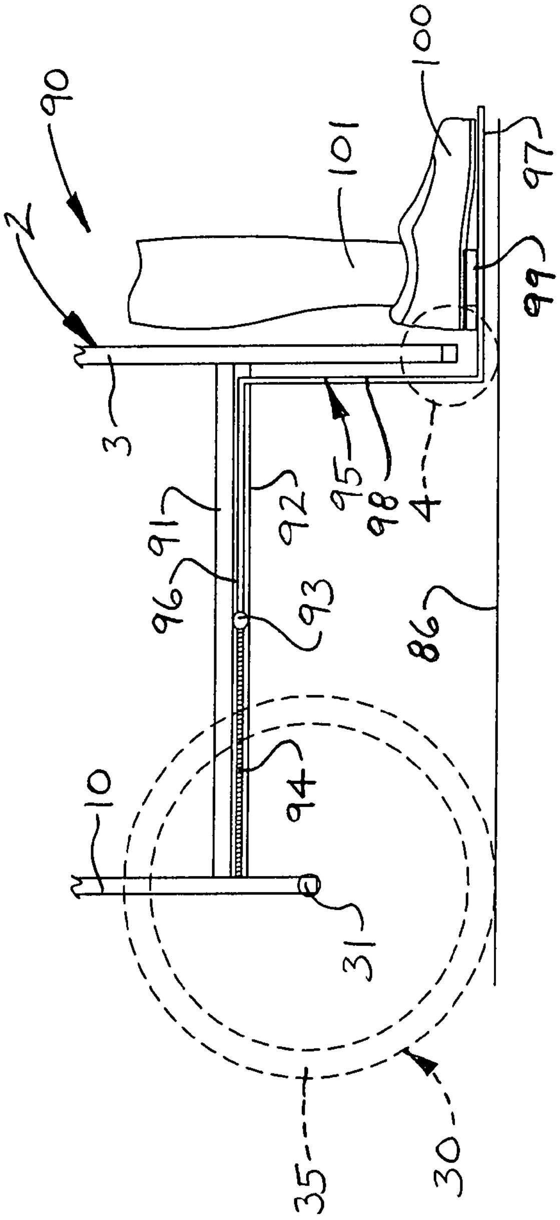
FIG. 12 is a side view, partially in section, of an illustrative embodiment of the wheelchair, more particularly illustrating a locomotion assist assembly provided on the wheelchair, with a user's shoe attached to the locomotion assist assembly and the assembly shown in a retracted configuration.
Figure 13:
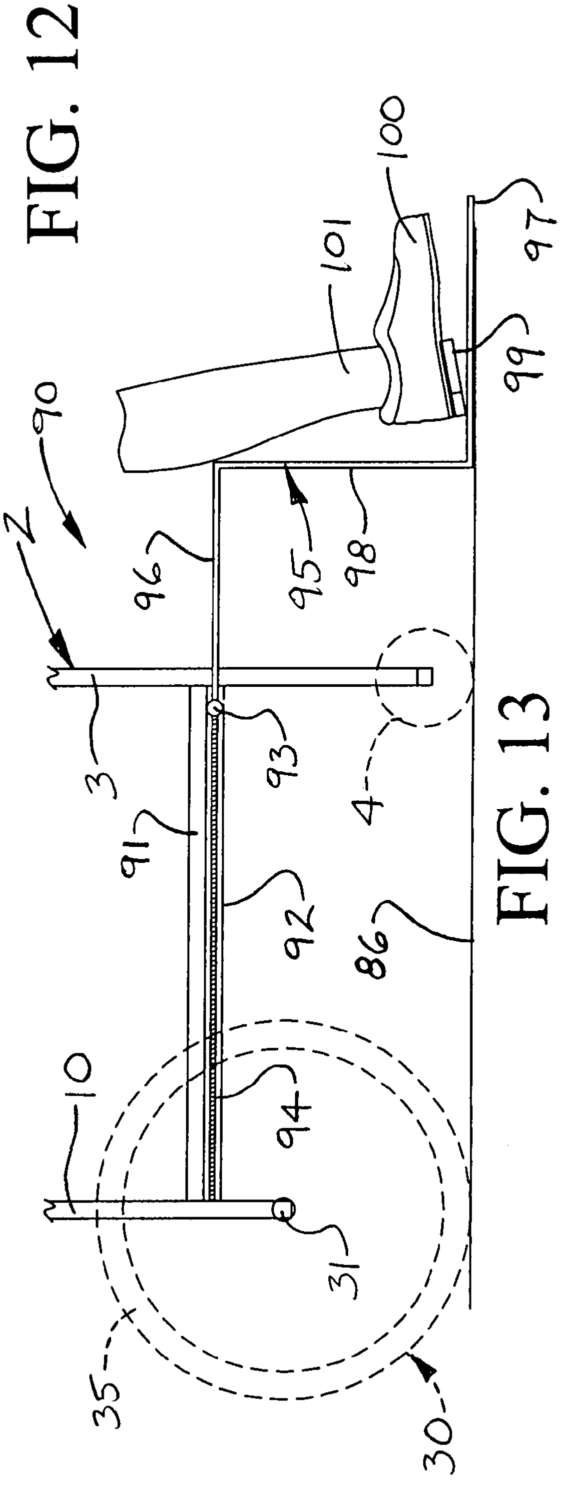
FIG. 13 is a side view, partially in section, of an illustrative embodiment of the wheelchair, with the location assist assembly shown in an extended configuration.

As illustrated in FIGS. 11 and 12, in some embodiments of the wheelchair 1, a locomotion assist assembly 90 is provided on the wheelchair frame 2. The locomotion assist assembly 90 includes a pair of roller mount frame members 91 (one of which is illustrated in FIGS. 11 and 12) each of which extends between the front frame member 3 and the rear frame member 10 on a corresponding side of the wheelchair frame 2. An elongated roller track 92 is provided on each roller mount frame member 91. A roller 93 is adapted to traverse each roller track 92. A roller spring 94 connects each roller 93 to the corresponding rear frame member 10 of the wheelchair frame 2. A generally "Z" shaped foot bracket 95 includes a roller attachment segment 96 which is attached to the roller 93. A connecting segment 98 extends from the roller attachment segment 96, in generally perpendicular relationship thereto. A foot attachment segment 97 extends from the connecting segment 98, in generally perpendicular relationship with respect to the connecting segment 98. A foot harness 99 of selected design is provided on the foot attachment segment 97. The foot harness 99 is adapted for attachment to a shoe 100 of a user 101 as the user 101 is seated on the seat 46 of the wheelchair 1. Accordingly, during locomotion of the wheelchair 1, the user 101 initially extends his or her shoe 101 forwardly as the roller 93 forwardly traverses the roller track 92 and tensions the roller spring 94 between the rear frame member 10 and the roller attachment segment 96 of the foot bracket 95, as illustrated in FIG. 13. The user 101 then pushes the foot attachment segment 97 of the foot bracket 95 against a floor 86 such that the roller spring 94 contracts and therefore, pulls the wheelchair 1 forwardly as the roller 93 rearwardly traverses the roller track 92, as illustrated in FIG. 12. Simultaneously, the user 101 typically grips and pushes the rear wheels 30 in conventional fashion to move the wheelchair 1 along the floor 86 on the front wheels 4 and the rear wheels 30. Therefore, the locomotion assist assembly 90 assists the user 101 in moving the wheelchair 1 forwardly along the floor 86.

In typical application, a user (not illustrated) sits on the seat panels 47 of the seat 46 and leans against the backrest panel 22. The cross straps 66 FIG. 9) can be extended over the user and fastened to the respective buckle receptacles 68 to secure the user in the wheelchair 1. The wheelchair 1 can be transported by having a person (not illustrated) grip the handles 21 on the respective handle frame members 20 of the wheelchair frame 2 and push the wheelchair 1 as the front wheels 4 and rear wheels 30 roll on a floor 86 (FIGS. 12 and 13). Alternatively, the user can operate the wheelchair 1 in forward, neutral and reverse modes by actuation of the drive motor 36 (FIG. 1) through manipulation of the control lever 39 on the control box 38. Still further in the alternative, the user can transport the wheelchair 1 by manually gripping and rotating the rear wheels 30. The user can engage the locomotion assist assemblies 90, as was heretofore described with respect to FIGS. 12 and 13, as needed to assist in locomotion of the wheelchair 1 on the floor 86. Various items (not illustrated), such as a leg prosthesis, for example, can be placed in the pockets 49 provided on the lower surface of the seat panels 47 of the seat 46. Additional items (not illustrated) can be placed in the pocket or pockets 63 (FIGS. 7 and 8) provided on the inner surface of one or both of the armrest panels 15.

As illustrated in FIG. 11, under circumstances in which it is necessary for the wheelchair 1 to traverse one or multiple steps 88, the wheelchair tracks 70 can be removed from the respective handles 21 and the track pegs 81 (FIG. 5) of each wheelchair track 70 removed from the corresponding peg box 84 (FIG. 1) and placed over the step or steps 88. The wheelchair 1 can be driven forwards or backwards up the wheelchair tracks 70 as the rear wheels 30 are driven in reverse by the drive motor 36 through manipulation of the control lever 39 of the control box 38. Accordingly, each rear wheel 30 and front wheel 4 of the wheelchair 1 traverses the track plate 71 (FIG. 6) between the track flanges 72 of each corresponding wheelchair track 70 until the wheelchair 1 reaches the top of the step or steps 88. The wheelchair tracks 70 are then removed from the step or steps 88 and placed back on the wheelchair frame 2 of the wheelchair 1, as illustrated in FIG. 1. During use, the wheelchair tracks 70 typically remain connected to the control box 38 through the light wiring 76 (FIG. 5). The track lights 75 can be illuminated, as deemed necessary, typically by actuation of the appropriate control (not illustrated) provided on the control box 38 or elsewhere on the wheelchair frame 2. When use of the wheelchair 1 is not necessary, the wheelchair frame 2 can be folded at the seat hinge 51, as illustrated in FIG. 14, to facilitate space-efficient storage of the wheelchair 1.

While the preferred embodiments of the invention have been described above, it will be recognized and understood that various modifications can be made in the invention and the appended claims are intended to cover all such modifications which may fall within the spirit and scope of the invention.

What is claimed is:

1. A wheelchair, comprising:

a wheelchair frame;

a pair of footrest support frame members carried by said wheelchair frame;

a pair of footrests carried by said pair of footrest support frame members, respectively;

a pair of rear wheels and a pair of front wheels carried by said wheelchair frame;

a drive motor drivingly engaging at least one of said pair of rear wheels and said pair of front wheels;

a pair of wheelchair tracks detachably carried by said wheelchair frame; and a pair of cris-crossing frame springs extending between said pair of footrest support frame members and said wheelchair frame.

2. The wheelchair of claim 1 wherein each of said pair of wheelchair tracks comprises a track plate and a pair of spaced-apart track flanges extending from said track plate.

3. The wheelchair of claim 2 further comprising a track opening provided in said track plate and detachably receiving said wheelchair frame.

4. The wheelchair of claim 3 further comprising a magnetic attachment ring carried by said track plate in generally concentric relationship with respect to said track opening.

5. The wheelchair of claim 1 further comprising a plurality of track lights provided on each of said pair of wheelchair tracks.

6. The wheelchair of claim 1 further comprising at least one track peg extending from each of said pair of wheelchair tracks and a pair of peg boxes carried by said wheelchair frame and detachably receiving said at least one track peg of said pair of wheelchair tracks, respectively.

7. The wheelchair of claim 1 wherein said wheelchair frame comprises a pair of spaced-apart front frame members; a pair of spaced-apart rear frame members spaced-apart with respect to said pair of spaced-apart front frame members, respectively; a frame stabilizer extending between at least one of said pair of spaced-apart front frame members and said pair of spaced-apart rear frame members; a pair of seat support frame members extending between said pair of spaced-apart front frame members and said pair of spaced-apart rear frame members; a seat carried by said pair of seat support frame members; a pair of handle frame members extending from pair of rear frame members, respectively; and a backrest panel extending between said pair of handle frame members.

* * * * *